July 19, 1960　　　H. GALLAGHER　　　2,945,669
FLUID VALVES

Filed Nov. 24, 1958　　　　　　　2 Sheets-Sheet 1

INVENTOR
HARRY GALLAGHER
BY Shoemaker & Mattare
ATTORNEYS

July 19, 1960 H. GALLAGHER 2,945,669
FLUID VALVES

Filed Nov. 24, 1958 2 Sheets-Sheet 2

INVENTOR
HARRY GALLAGHER
BY
Shoemaker & Mattare
ATTORNEYS

United States Patent Office 2,945,669
Patented July 19, 1960

2,945,669

FLUID VALVES

Harry Gallagher, Embsay, Skipton, England, assignor to J. Brooksbank Limited, Skipton, England, a body corporate of Great Britain Filed Nov. 24, 1958, Ser. No. 776,021

5 Claims. (Cl. 251—309)

This invention relates to valves for fluids and liquids and has for its principal object to provide a reliable valve which can be used in either direction of flow, and which does not rely for its sealing across the valve, nor necessarily for its sealing to atmosphere, on metal to metal seating surfaces but which achieves such sealing through elements of rubber or similar resilient material which bed on metal surfaces and there make an effective seal without the need of any lapping or expensive seat grinding operations.

According to the present invention, a valve consists of a housing with inlet and outlet ports with an opening in its top face through which the valve plug is inserted, so that when fitted, the valve plug rotates about an axis at right angles to the centre line of the ports, and may be pivoted on a stub pin located at the bottom of the housing and on the operating spindle which passes through a cover fixed to the top face of the valve housing after the plug has been inserted.

At least one of the valve ports in the valve housing is surrounded by a part spherical internal land, the spherical centre of which is placed at the intersection of the port axis and the axis of rotation of the plug.

The plug itself consists essentially of a hollow trunk portion which in the open position of the valve comes to lie between valve ports in the housing and provides a through tubular flow connection between them. When the plug is rotated to close the valve, a shaped boss portion is brought to face against at least one spherical land surrounding a valve port.

This shaped boss portion of the plug carries a rubber ring clamped to it, which comes to make contact with the valve port land over a narrow annulus surrounding the port and thus seals off the liquid flow from and to this port.

The valve plug is so designed that, apart from its axis pivot, it does not necessarily make any metal to metal contact with the housing at any point in either the open or closed position.

In one embodiment, the bottom pivot upon which the valve plug rotates is a stub inserted into a hole in the bottom of the valve housing, and conveniently secured therein. A static seal to atmosphere may be provided on the stub by means of a rubber O ring placed in a groove and sealing the bore of the pivot boss, or other convenient sealing means may be employed.

The top cover is fixed to the valve housing and sealed against it. The operating spindle passes through this cover and engages the valve plug by means of a spigot entering a suitably formed socket in the latter. The spindle spigot is conveniently formed with a stepped portion which engages a recess in the valve plug, and thereby form a key to effect the rotation of the plug. The lever spindle may be sealed in the valve cover by means of a rubber O ring in a groove, or other convenient sealing means may be employed.

On the top of the valve cover convenient bosses may be provided to act as stops for the operating of the lever in the open and closed position of the valve or internal stops may be provided for the same purpose.

An important feature of the design is the rubber sealing ring on the shaped boss portion of the valve plug which comes to seal against the part-spherical internal land around the valve port in the closed position.

This rubber ring is set into a recess, on the valve plug. The ring conveniently has an outer cylindrical surface which fits into the recess and may have a flat bottom face which can rest on the bottom of the recess. The top of the ring section projects from the top of the recess and may be of approximately semi-circular section. The inner face of the ring may conveniently be formed slightly conical with the apex of the cone on the side of the base of the ring. A clamping plate or ring with conical or similar outer surface is then placed inside the rubber ring and secured to the valve plug by screws so that when it wedges against the rubber ring it secures this firmly to the valve plug, leaving the top of the rubber ring clear and by adjusting the wedge pressure put on to the rubber ring by the clamping means, it is possible to regulate the height to which the crown of the rubber ring projects above the boss portion of the valve plug. The compression applied to the rubber ring by the clamping means is partly radial and partly axial. By increasing the compression the rubber will tend to squeeze out towards the open free crown which provides the seal against the port land.

By securing the rubber ring firmly in the plug, it cannot be disturbed by any jet impact or eddy flow condition which might occur in the valve with high fluid velocities. Also with one rubber sealing ring only it is possible to use the valve in either direction of flow. It will be appreciated that the term rubber as used herein is intended to embrace synthetic rubber and other resilient materials having appropriate abrasion and corrosion resistance.

The invention will be further described with reference to the accompanying drawings where embodiments of full flow valve are illustrated by way of example and wherein:

Figures 1 to 3 illustrate one embodiment, Figure 1 being a vertical section with the valve plug in the closed position, and Figure 2 a similar view with the plug rotated through 90° showing the straight-through connection between inlet and outlet ports, while Figure 3 is a plan view with the cover removed and showing the plug in the open position corresponding to Figure 2.

Figure 1:
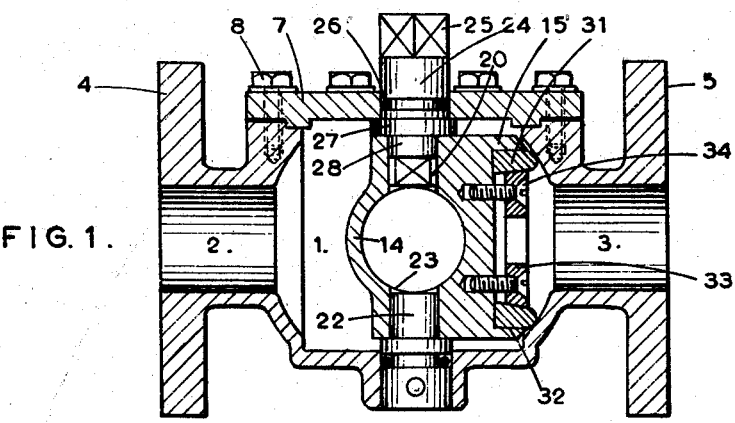

Referring now to the drawings, but first more particularly to Figures 1 to 5, 1 generally designates a valve housing with aligned inlet and outlet ports 2 and 3, 4 being a coupling flange around the inlet port 2, and 5 a similar flange around the outlet port 3.

6 generally designates the valve plug inserted into the housing 1 through an opening in the top thereof which is subsequently closed by a cover plate 7 of generally circular form secured to the housing by a series of peripherally arranged bolts 8. In this embodiment the opening in the housing 1 is surrounded by a machined surface 9 forming a seat for the cover the underside of which is provided with a locating shoulder 10 ensuring that the cover is properly centralised when the bolts 8 are screwed home.

Figure 2:
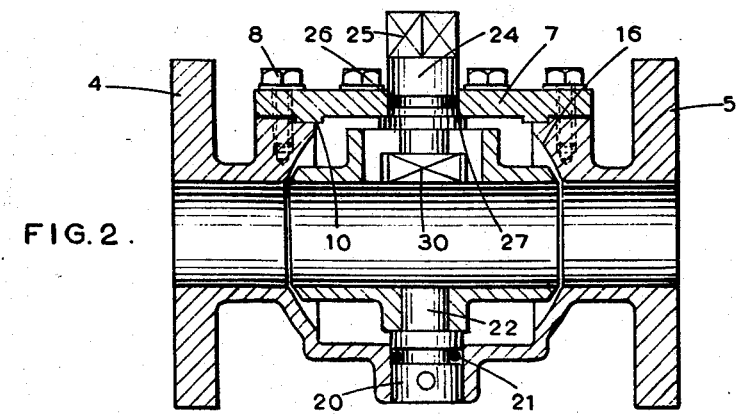
Figure 3:
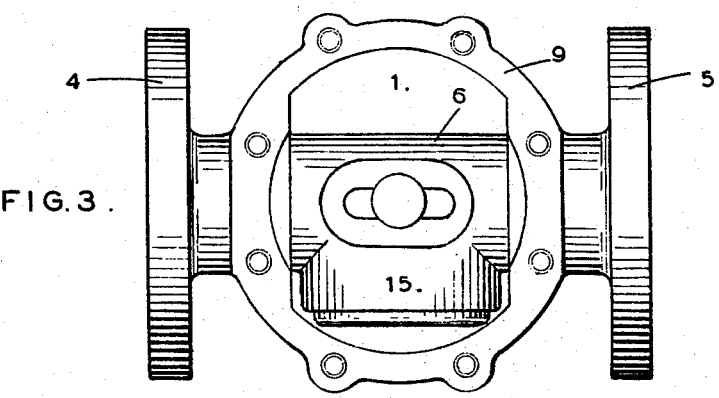
Figure 4:
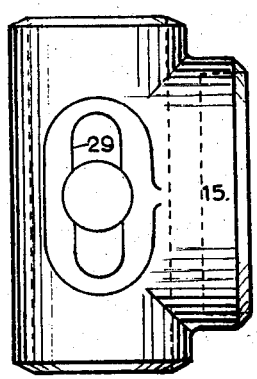
Figures 4 and 5 are views of the plug removed in plan and vertical section respectively.
Figure 5:
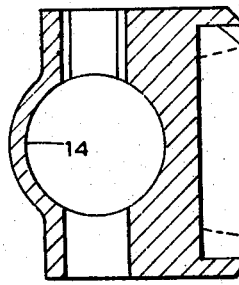

In this embodiment the plug 6 consists essentially of a hollow trunk portion 14 which in the open position of the valve as shown in Figures 2 and 3 is in axial alignment with the inlet and outlet ports 2 and 3 and provides an uninterrupted tubular connection between them, and a shaped boss portion 15 which in the closed position of the valve as shown in Figure 1 faces a part spherical land 16 surrounding a valve port.

Fixed in a central aperture in the bottom of the housing is a vertical bearing member 20 in the form of a stub pin mounting a sealing ring 21 making a fluid-tight joint with the aperture in the housing, and an upstanding cylindrical shank 22 which forms the bottom pivot for the plug 6, the latter being formed with a vertical cylindrical bore 23 which rides on the shank 22.

24 is an operating spindle which is mounted centrally in an aperture in the cover plate 7 above the bearing 22, the projecting portion of the spindle being shown with the square end section 25 to take an operating lever, and a cylindrical portion of the spindle being grooved to take a sealing ring 26, making the fluid-tight connection between the spindle 24 and the wall of the aperture in the cover plate 7.

27 is a peripheral flange on the spindle underneath the cover, and 28 is a spigot projecting downwardly into a socket 29 in the valve plug 6, the spigot and socket having complementary shaped portions, as represented at 30, which cause the plug to rotate when the spindle is rotated.

31 is a sealing ring suitably of rubber which is set in a recess having a cylindrical wall 32 in the bossed portion 15 of the plug 6. The ring 31 has an outer cylindrical surface fitting the wall of the recess and a flat bottom face resting on the base of the recess while the top of the ring projects and has an approximately semicircular section.

The inner face of the ring 31 is slightly conical to cooperate with the similarly shaped clamping ring 33 secured to the plug by screws 34, and it will be appreciated that by adjusting the pressure exerted on the ring by the clamping means the height to which the crown of the ring projects beyond the bossed portion 15 of the plug can be regulated.

Figure 6:
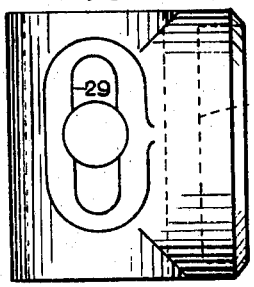
Figures 6 to 8 are plan views of three alternative forms of valve plug.
Figure 7:
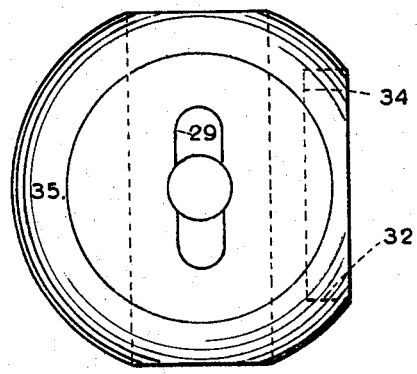
Figure 8:
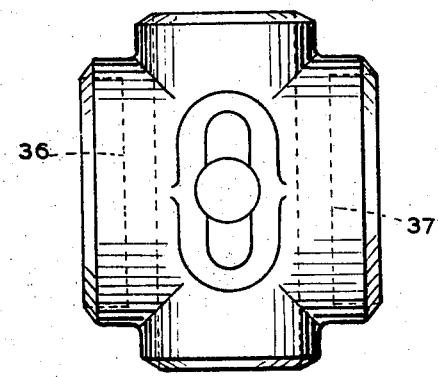

Figures 6 to 8 show alternative forms of plug, the embodiments shown in Figures 6 and 7 providing a single recessed seat 34 for a sealing ring, and the plug shown in Figure 7 having a generally spherical protuberance 35 on the wall of the plug opposite the seat.

The embodiment shown in Figure 8 provides two seats 36 and 37 for sealing rings adapted to co-operate with internal spherical lands around both the ports 2 and 3 of the valve housing.

What I claim is:

1. A fluid valve comprising a housing having a main body portion provided with a hollow interior, said housing having inlet and outlet ports leading to said hollow interior, the inner surface of said main body portion being provided with a spherical concave land surrounding one of said ports, a rotatable valve plug disposed within the interior of said main body portion of the housing, said plug being provided with diametrically opposed bores and with the major portion of said plug being offset laterally with respect to the axis of said bores, said laterally offset portion of the plug being provided with a convex generally spherical surface, a resilient ring mounted concentrically of such convex spherical surface and protruding slightly therefrom, said main body portion of the housing being opened on one side thereof, a cover plate normally closing such open side of the housing, a first spindle mounted in said cover plate and extending inwardly into one of the bores in said plug, a second spindle mounted diametrically opposed to the first mentioned spindle and projecting interiorly of the housing into the other bore of said plug whereby said plug is rotatably mounted within said housing, said resilient ring being firmly seated against said concave land in the housing in one position of rotation of said plug, said plug having a passage completely therethrough extending axially at right angles to said generally spherical convex surface of the plug so as to interconnect said ports in another position of rotation of said plug, said cover and spindles being removable to permit removal of said plug.

2. The assembly as defined in claim 1 wherein said spindles are disposed on an axis passing through the geometrical center of said hollow interior of the housing, said passage in the plug being directly between said bores therein whereby the side of said plug opposite the laterally offset portion projects laterally only a minor amount as compared with the lateral offset upon which said convex surface is formed, whereby the entire plug may be removed from the housing without disturbing any portion of the housing other than said cover plate.

3. The assembly as defined in claim 1 wherein said plug is provided with outwardly extending portions concentric with said passage therethrough and being of a width to reach substantially between said ports.

4. The assembly as defined in claim 1 wherein said valve plug is provided with a recess concentrically disposed with respect to said generally spherical convex surface, said resilient ring being mounted within said recess and bottomed therewithin but being of a height to protrude slightly therebeyond, and means retaining said ring within said recess.

5. The assembly as defined in claim 4 wherein said ring is provided with an inwardly tapering inner surface, said means being in the form of a tapered disc engaging the inner surface of said resilient ring.

References Cited in the file of this patent

UNITED STATES PATENTS

| 1,824,511 | Spieser | Sept. 22, 1931 |
| 2,233,074 | Corbin | Feb. 25, 1941 |
| 2,819,868 | Couffman | Jan. 14, 1958 |
| 2,857,130 | Brisbane | Oct. 21, 1958 |

FOREIGN PATENTS

| 444,841 | Great Britain | Mar. 30, 1936 |